(12) United States Patent
Griffin

(10) Patent No.: US 7,082,637 B1
(45) Date of Patent: Aug. 1, 2006

(54) COMPACT FOLDABLE RAMP

(76) Inventor: Stephen S. Griffin, 500 - 325th Ave. SE., Lacey, WA (US) 98503

( * ) Notice: Subject to any disclaimer, the term of this patent is extended or adjusted under 35 U.S.C. 154(b) by 0 days.

(21) Appl. No.: 10/802,347

(22) Filed: Mar. 17, 2004

(51) Int. Cl.
*E01D 1/00* (2006.01)

(52) U.S. Cl. .................................. 14/69.5; 414/537

(58) Field of Classification Search ................ 14/69.5, 14/71.1, 72.5; 244/137.2; 52/173.2; 414/537
See application file for complete search history.

(56) References Cited

U.S. PATENT DOCUMENTS

| | | | | |
|---|---|---|---|---|
| 3,352,440 A | * | 11/1967 | Wilson | 414/537 |
| 4,571,144 A | * | 2/1986 | Guidry et al. | 414/537 |
| 4,606,090 A | * | 8/1986 | Beard | 14/72.5 |
| 4,761,847 A | | 8/1988 | Savage et al. | |
| 4,864,672 A | * | 9/1989 | Altieri et al. | 14/69.5 |
| 4,944,546 A | | 7/1990 | Keller | |
| 5,062,174 A | * | 11/1991 | DaSalvo | 14/69.5 |
| 5,287,579 A | * | 2/1994 | Estevez, Jr | 14/71.1 |
| 5,312,148 A | | 5/1994 | Morgan | |
| 5,440,773 A | * | 8/1995 | Lentini | 14/69.5 |
| 5,645,394 A | | 7/1997 | Hays | |
| 5,671,496 A | | 9/1997 | Smith | |
| 5,853,281 A | | 12/1998 | Farmer | |
| 5,988,725 A | * | 11/1999 | Cole | 296/61 |
| 6,009,587 A | | 1/2000 | Beeman | |
| 6,119,634 A | * | 9/2000 | Myrick | 119/847 |
| 6,354,788 B1 | * | 3/2002 | Adams | 414/537 |
| 6,378,926 B1 | * | 4/2002 | Renze et al. | 296/26.11 |
| 6,430,769 B1 | * | 8/2002 | Allen | 14/69.5 |
| 6,634,848 B1 | * | 10/2003 | Henderson | 414/537 |
| 6,722,721 B1 | * | 4/2004 | Sherrer et al. | 296/61 |

* cited by examiner

*Primary Examiner*—Raymond Addie
(74) *Attorney, Agent, or Firm*—Reidlaw, L.L.C.; Thomas A. Olson; John S. Reid

(57) ABSTRACT

A multi-section ramp hinged longitudinally end-to-end uncurls from a portable mode into an arc of hinged sections in open, or operational mode, each adjacent section pair limited in opening rotation at less than 180 degrees as adjacent section ends come into abutment. In its folded position, more upper ramp sections nest in respective adjacent next lower ramp sections, in a stacked nesting configuration resulting in a tightly compact, mobile unit easily storable in a small volume and transported by hand. Each section comprises a runway in the form of a plate with vertical panels on each runway lateral side extending downward from the runway and with vertical end members on each runway longitudinal end, forming an inverted open box. Longitudinal strengthening ribs run between end members and pass into aligned slots in more inner runway sections upon ramp folding so inner sections can nest more within the larger sections without impacting the ribs.

6 Claims, 6 Drawing Sheets

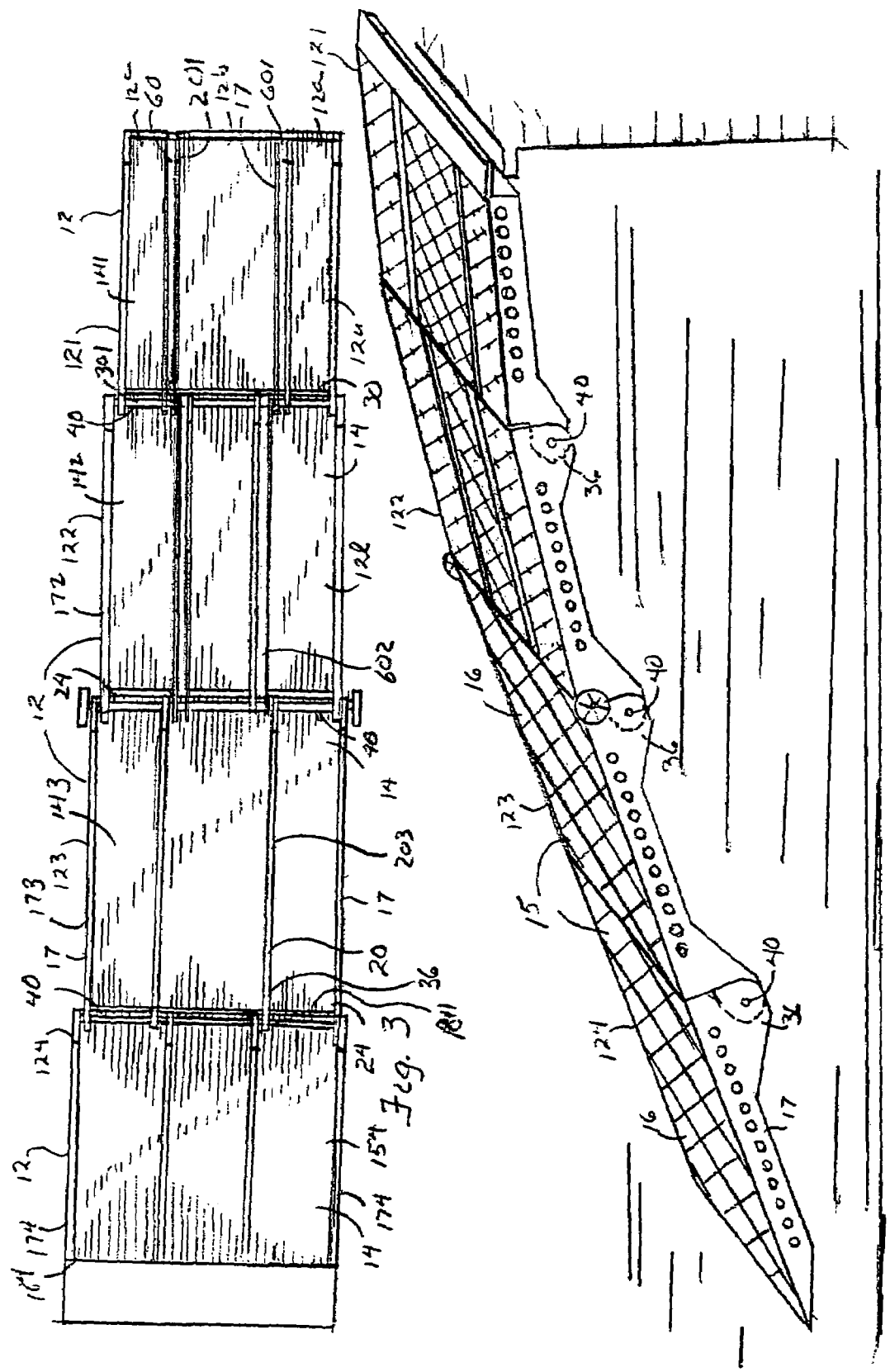

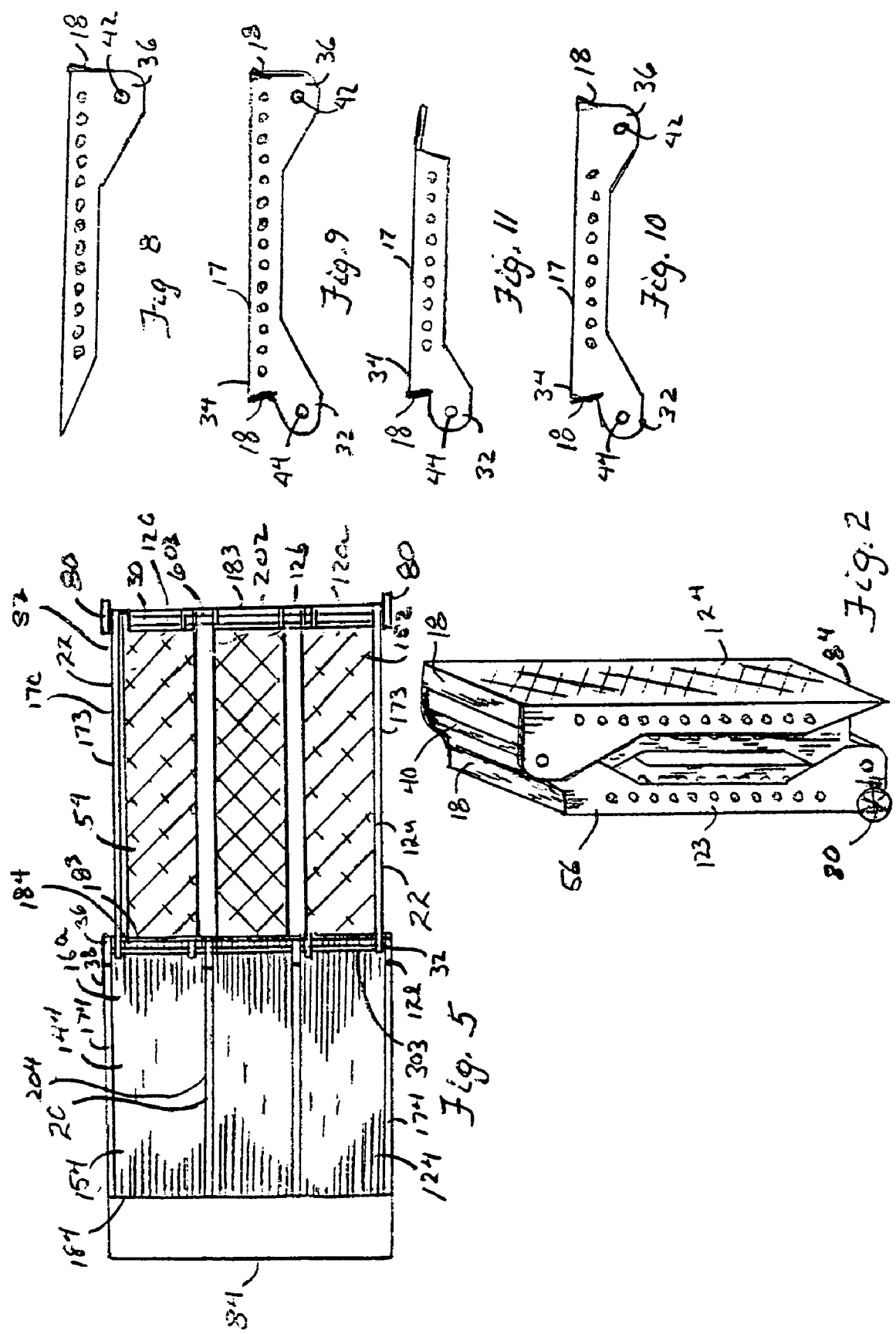

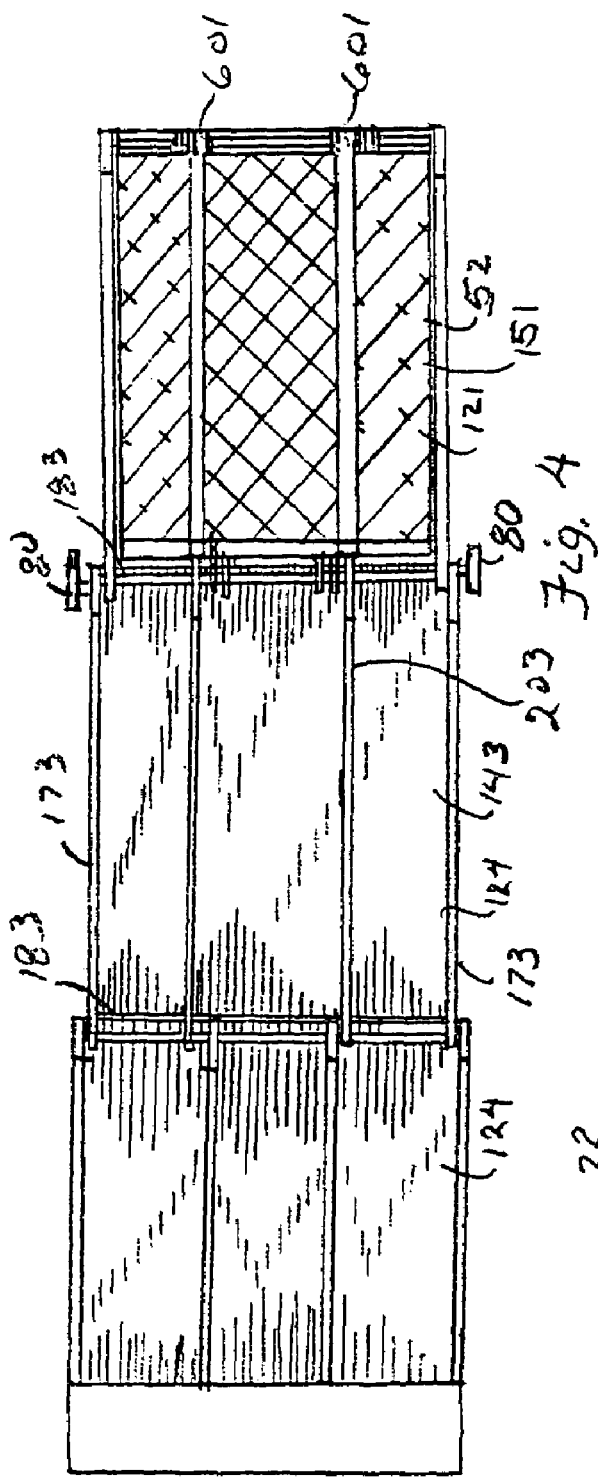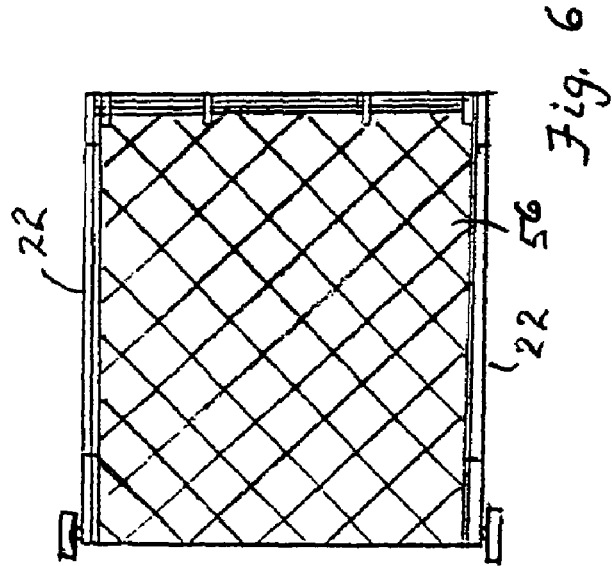

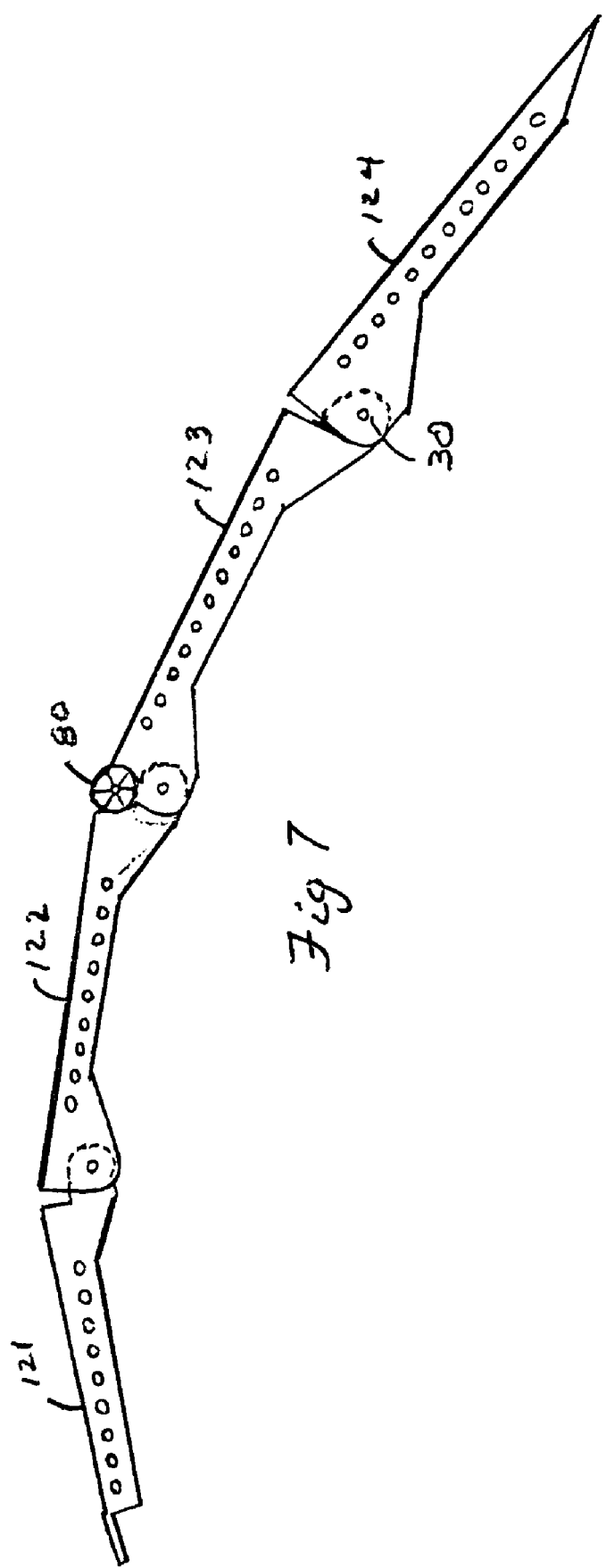

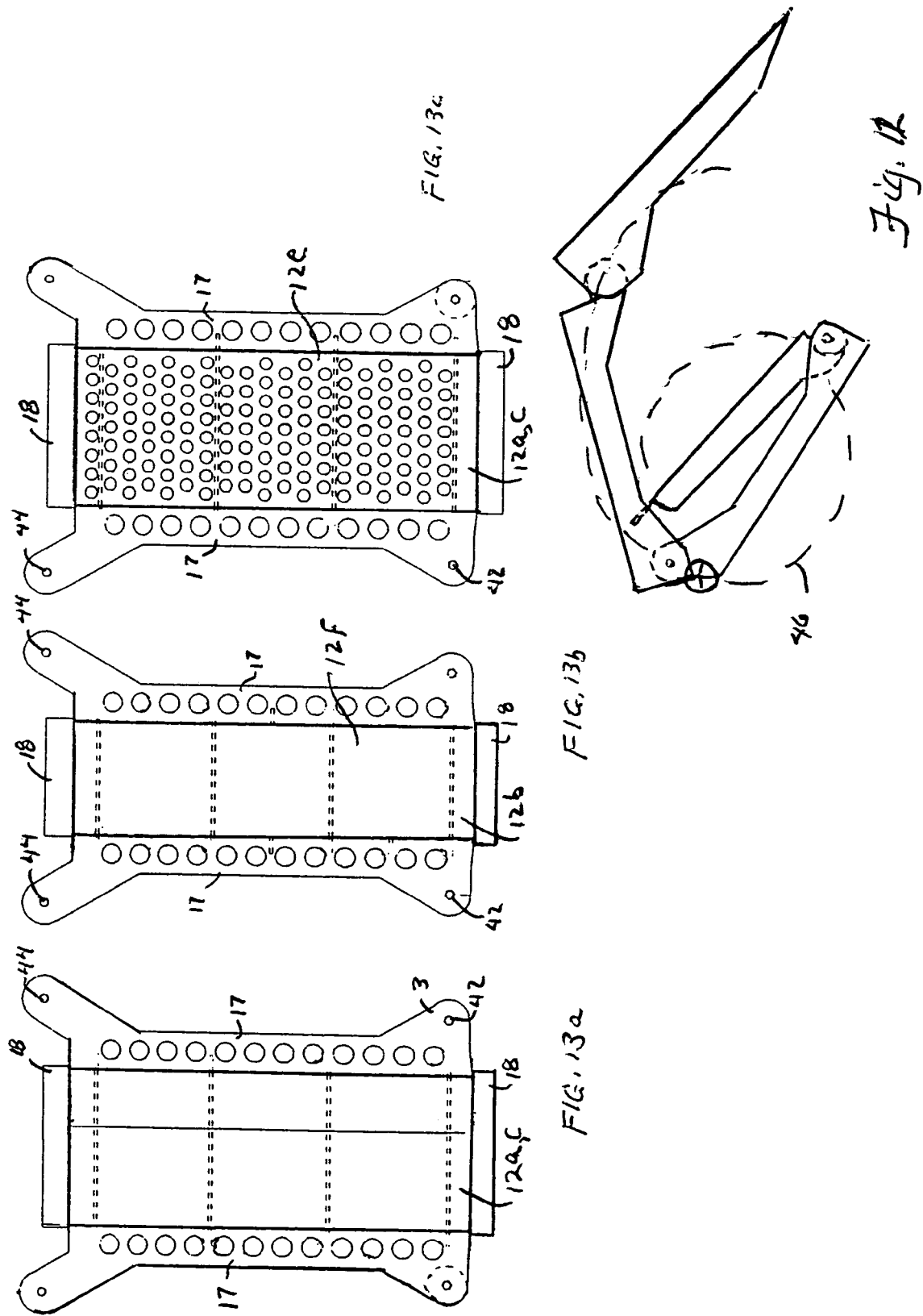

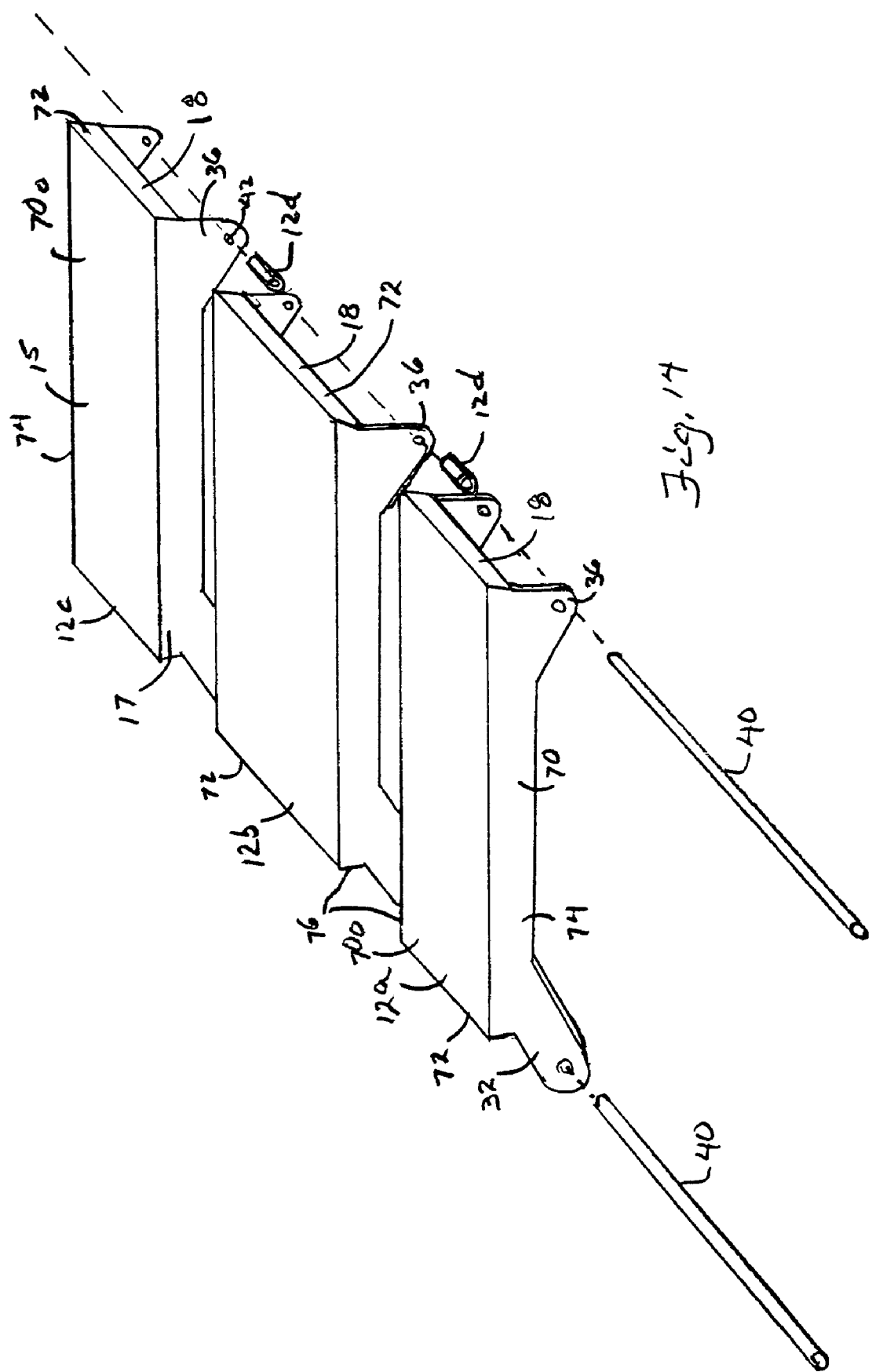

COMPACT FOLDABLE RAMP

BACKGROUND

1. Field of the Technology

This invention relates to ramps for loading and unloading from a first level to a second level and to ramps serviceable as temporary bridges. More specifically, the invention relates to a foldable ramp with successively nesting ramp sections hinged together end-to-end in moving between a compact mobile package and an open operational runway.

2. Prior Art

Loading wheeled vehicles, such as motorcycles, small utility vehicles, and lawnmowers, onto larger vehicles, such as pickups or flatbed trucks have been difficult for some time. Ramps for such loading and unloading of vehicles have been proposed but remain inadequate, typically being inconveniently large and heavy or not conveniently storable away from the truck. Perhaps because of the weight and large folded size, ramps have often been integrated into the vehicle, such as a substitute for or integrated with a truck tailgate.

Various types of foldable ramps have been disclosed. It is common for sections to be hinged end to end, such as with ramps with two longitudinal sections connected by a transverse hinge folded in face-to-face opposition, as in U.S. Pat. No. 6,009,587 by Beeman and U.S. Pat. No. 4,761,847 by Savage et al. or such as in ramps with more than two sections that fold together in a "Z" or accordion arrangement, such as in U.S. Pat. No. 5,062,174 by DaSalvo and U.S. Pat. No. 4,944,546 by Keller. These ramps are serviceable but remain unduly large and inconvenient to transport. With the accordion style folding, the ramp load capacity is also necessarily limited by whatever mechanism is employed to keep the upward oriented hinge joint from opening under load. A lightweight portable and compact ramp remains an unresolved requirement.

SUMMARY

It is the object of the present invention to provide a portable ramp particularly suitable as a runway for small-wheeled vehicles such as motorcycles and even wheelchairs and small utility vehicles. (For purposes herein, the term portable is meant to indicate an ability to be moved independent of a platform to which it may be temporarily connected or associated during use.) It is another object that the ramp be compact for ease of storage and transport. It is a further object that the ramp be of lightweight design. It is a still further object that all of the ramp hinge joints be urged into compressive union under load, inherently increasing load capacity.

These objects are achieved in a multi-section ramp hinged longitudinally end to end that uncurls from a portable mode into an arc of hinged sections in open, or operational mode with longitudinal adjacent section ends abutted at less than 180 degrees. In its folded position, more upper ramp sections nest in respective adjacent next lower ramp sections, in a stacked nesting configuration. For purposes within, stacked nesting is meant to describe one section within a second section which in turn is within a third section, etc.

The ramp comprises a plurality of sections, typically four, and for ease of description, the ramp is described as having four sections. However, it should be understood that the ramp could conceivably comprise more than four sections without deviating from the disclosure of the invention. Such ramps with more than four sections are to be deemed included in this invention.

Each section comprises a runway in the form of a plate with panels on each runway lateral side and with end members on each runway longitudinal end, forming an inverted open box. Longitudinal strengthening ribs run between end members and pass into aligned slots in first and second runway sections so these sections can nest within the larger sections without impacting the longitudinal ribs. Shallow transverse strengthening ribs run between panels, interrupted only by said slots in first and second sections. Thus, all sections fold into close face-to-face, parallel opposition with another ramp section spaced apart from the section runway only by the shallow transverse ribs. The resulting folded ramp then presents a tightly compact, mobile unit easily stored in a small volume and transportable by hand.

BRIEF DESCRIPTION OF THE DRAWINGS

FIG. 1 is perspective side view of the ramp of the present invention in unfolded, operational position, shown with a pair of wheels on which the ramp can roll when folded. Also shown are two upper sections with slots dividing the sections into section portions, the slots provided to receive strengthening ribs of the lower sections when the upper sections fold compactly into the larger lower sections.

FIG. 2 is a perspective view of the ramp of FIG. 1 folded into a compact portable unit, shown standing on the wheels and the distal end of the last section.

FIG. 3 is an underside view of the ramp unfolded, showing the longitudinal strengthening ribs aligning with slots.

FIG. 4 is also an underside view of the ramp shown with the first section folded against the second section with their runway bottom surfaces nested in close opposing, parallel disposition, forming a section pair.

FIG. 5 is a further underside view of the ramp shown with the section pair of FIG. 4 rotated against the third section with the first section runway top surface nested in close opposing, parallel disposition to the third section bottom surface, forming a section trio.

FIG. 6 is a still further underside view of the ramp shown with the section trio of FIG. 5 rotated against the fourth section with the second section runway top surface nested in close opposing, parallel disposition to the fourth section bottom surface, forming a section quartet.

FIG. 7 is a side view of the panel shown slightly unfolded on hinges between adjacent ramp sections hinged end to end opening downward, illustrating section ends in near abutment that prevents the sections to hinge open beyond 180 degrees and in fact less than 180 degrees to form an arc that conveys compressive forces to ramp ends under load.

FIG. 8 is a side view of the first section panel.

FIG. 9 is a side view of the second section panel.

FIG. 10 is a side view of the third section panel.

FIG. 11 is a side view of the fourth section panel.

FIG. 12 is a side view of the panel partially folded illustrating the nature of folding as an approximate curl of the collective panel sections.

FIG. 13a is a plan view of a typical section outer box component showing side panels, end longitudinal end members, and supporting ribs before the panels and end members are folded to form an inverted open box.

FIG. 13b is a plan view of a typical section inner box component showing side panels, end longitudinal end members, and supporting ribs before the panels and end members are folded to form an inverted open box.

FIG. 13c is a plan view of the section outer box component of FIG. 13a a perforated runway.

FIG. 14 is an exploded view of a typical section formed by three component inverted open boxes of FIGS. 13a–c, shown with a spacer to establish section slots. For sections without slots, the spacers are omitted and the boxes are assembled side by side.

DETAILED DESCRIPTION OF THE PREFERRED EMBODIMENTS

Referring to the figures, and particularly to FIG. 1, the foldable ramp 10 of the present invention comprises a plurality of ramp sections 12, typically four, hinged end to end, disposed such that all adjacent sections rotate on hinges 30 only inward as shown in FIG. 3, that is, with section bottom surfaces 14 rotating toward each other during folding and away from each other during opening, in respective curling and uncurling motions in an approximate spiral path with each more upper section folding first and curling to nest within a larger, next lower section. So nested, runway top surfaces 15 and bottom surfaces 14 lie in close, parallel opposition.

Each upper section 12u is dimensioned slightly smaller than its next lower adjacent section 12l both longitudinally and transversely such that upon folding the upper section 12u with its runway 16, panels, 17, end members 18 and strengthening ribs 20 is nested within the lower section 12l. For ease of description, each section above an adjacent section is deemed to be smaller than its adjacent lower section. However, it should be understood that it is deemed equivalent to have a lower section smaller than and folding into a larger adjacent upper section. Also, it is understood that use of terms such "nesting" and "fitting within" and other similar terms are meant to convey a smaller section fitting within the another section into which it nests; that is between the lateral side panels and end members 18 and in close face-to-face opposition to the underside of each section runway. It does not necessarily require that those side panels and/or end members extend from the respective runways beyond an inner section nested within. For ease of description, sections may be designated numerically, such as first section, second section, third section, and fourth section etc. This nomenclature is for convenience of description only and should not be construed as limiting the number of sections.

The ramp sections 12 open fully to an operational mode with adjacent section end members 18 abutting, inherently preventing adjacent sections from opening beyond 180 degrees. Section end members 18 are disposed transversely on adjacent ramp section longitudinal ends at less than 90 degrees from runway 16, each end member with an abutting surface 19 facing outward from its respective section end with its normal (line perpendicular to its face) longitudinal with the ramp, the runway ending at the end members 18, so that end members 18 of adjacent sections 12u and 12l abut longitudinally face to face with their respective runways meeting at less than 180 degrees creating an arc along the ramp runway. Thus, under load the ramp section end members 18 abut under compressive forces, urging them together with stability increasing under increasing load.

The ramp sections 18 are strengthened by the side panels 17 (shown in FIGS. 8–11) depending vertically downward from the section runway 16 along each section lateral side 22 and longitudinal strengthening ribs 20 running longitudinally between section longitudinal ends 24, between and parallel to side panels 17 and terminating in longitudinal abutment with said end members. Shallow transverse strengthening ribs 26 extend between panels 17 and longitudinal strengthening ribs 20 and between pairs of strengthening ribs 20.

Turning to the hinges 30 and referring primarily to FIG. 1 and FIG. 12, it is helpful to describe the hinge configuration in relation to upper and lower adjacent sections 12u and 12l. It has been described that for each pair of adjacent sections, one will be smaller than the other so that the smaller can nest within the larger. Consistent with the assumed nomenclature herein, in describing the hinge 30, the smaller adjacent section will be referred to as the upper section 12u and the larger adjacent section will be referred to as the lower section 12l. Similarly, an upper element will indicate in the direction of the smaller section and a lower element will indicate in the direction of the larger element. Continuing, hinge ears 32 on lower ends 34 of each of the side panels 17 and lower ends 36 of the longitudinal strengthening ribs 20 (except the last or lowest section) extend below and beyond an upper section 12u reaching under the adjacent lower section 12l. A hinge plate 36 extends vertically downward under the runway lower surface 16a of the lower section 12l inward from a lower section end member 18 on a lower section first end 38, that is, longitudinally between the section end members at an upper end of said lower section. A hinge bar 40 passes through a hinge plate hole 42 aligned with a hole 44 in the hinge ears 32 on the ribs 20 below the ribs 20 of the lower section 12l and on each section lateral side 22 forming the hinge 30 between the adjacent upper and lower sections 12u and 12l, longitudinally. Thus, when the upper section 12u pivots on the hinge 30, it folds fully under the adjacent lower section 12l, inward of the lower section end member 18.

As also shown in FIG. 3, ramp hinges 30 between adjacent sections 12u and 12l are below the ramp runway 16 enabling the ramp 10 to fold in the general nature of a crude spiral path 46 as shown in FIG. 12. With ramp hinges 30 below the abutting end members 18, load forces are absorbed as compressive forces through the abutting member ends 18 and the ramp load is transferred to ramp end members 18 largely as if the ramp were a single unit. Beyond the abutting sections, the ramp load limit is derived from the stress transferred to the ramp hinges 30 located below the abutting end members 18. It is understood that as compressive forces act at the abutting end members, tension forces act below those end members, which are absorbed by the hinge. Provided the sections have sufficient support strength greater than the hinge strength, the ramp load capacity is then limited only by the hinge strength.

To accommodate longitudinal strengthening ribs 20 as the two upper most sections 121 and 122 nest together, the rib ears 32 of the upper most, or first, section 121 connect pivotably to the hinge bar 40 outside of the ears 32 of the next lower, or second, section 122, also folding together in face-to-face opposition in scissor-like fashion. The scissor-like closing of the strengthening ribs 20 and panels 17 assures that the sections 12 do not bind during folding but remain fully aligned. Respective side panels 17 of nesting sections slide in scissor-like fashion into opposing face-to-face disposition with the runway bottom surface 14 of the two sections also in opposing close parallel face-to-face disposition.

The two upper sections 121 and 122, or first and second sections, rotate on their hinge 301 into a folded configuration with their runway bottom surfaces 141 and 142 in close parallel opposition forming a section pair 52, as shown in FIG. 4.

In continuing the compact folding process, as shown in FIG. 5, the section pair 52 pivots as a unit on the next lower hinge 302, between the second and third sections 122 and 123, such that the pair 52 nests into the third section 123 (counted from the top, or smallest section) with the first section runway top surface 151 folding into face-to-face opposition and parallel to the third runway bottom surface 143, forming a trio 54 of sections with the third section panels 173 and member ends 183 around the section pair 52. In thus folding into the third section 123, the panels 172 of the second section 122 fold in scissor-like fashion into face-to-face opposition with the panels 173 of the third section 123.

To accommodate the ribs 203 of the third section 123 as the section pair 52 nests into the runway underside 143 of the third section 123, the first section runway top surface 151 includes longitudinal slots 601 aligned with the ribs 203 of the third section 123 such that as the section pair 52 rotates into its fold position, nesting within the third section side panels 173 and end members 183, the third section ribs 203 move into the first section slots 601.

Further in continuing the compact folding process, as shown in FIG. 6, the section trio 54 pivots as a unit on the next lower hinge 303, between the third and fourth sections 123 and 124, such that the trio 54 nests into the fourth section 124 with the upper runway surface 152 of the second section 122 folding into face-to-face close parallel opposition to the runway bottom surface 144 of the fourth section 124, forming a section quartet 56 with the fourth section panels 174 and end members 184 around the section trio 56. As before, the panels 173 of the third section 123 fold in scissor-like fashion into face-to-face opposition with the panels 174 of the fourth section 124.

In similar manner as above, to accommodate the ribs of the fourth section 124 as the trio 56 nests into the underside 154 of the fourth section 124, the second section runway top surface 152 includes longitudinal slots 602 aligned with the longitudinal ribs 204 of the fourth section such that as the trio 56 rotates into its fold position, nesting within the fourth section side panels 174 and end members 184, the fourth section ribs 204 move into the second section slots 602.

As shown in FIG. 3, the slots 601 and 602 of the first and second sections comprise strengthening ribs 201 and 202 on each side of the section slots, respectively. Thus the slots divide these sections into three section portions 12*a*, 12*b* and 12*c* with a central portion 12*b* separated from the outer portions 12*a* and 12*c* by a spacer 12*d* on the hinge bars 40 between central and outer sections on each section end that defines the slot 60 by separating the section portions, as further illustrated in FIG. 14. The inner portion 12*b* may comprise a porous plate or a mesh 12*e* to minimize weight of the section runway while still accommodating riding of a wheeled vehicle thereon, such as a motorcycle. The outer section portions 12*a* and 12*c* may comprise a solid plate 12*f* that facilitates a person safely walking alongside the motorcycle.

As shown in FIG. 14, the sections may comprise boxes 70 open at their bottoms as section components. With the end member 18 comprising a plurality of end member portions, longitudinal ends 72 of boxes 70 collectively comprise a section end portion 73 bridging adjacent lateral sides therein closing each box circumference. Section tops 15 comprise a plurality of segments 71 that respectively are box tops. Outer lateral sides 74 of outer boxes 70*o* comprise section panels 17. Inner lateral sides 76 of boxes 70 comprise section longitudinal strengthening ribs 20. With the boxes 70 spaced apart by spacers 12*d* they form section slots 60. When assembled together without spacers, adjacent box sides together form a single longitudinal rib 20.

In folded configuration, the two lowest and largest sections 123 and 124 thus enclose the remaining smaller sections 121 and 122 nested between them. A wheel 80 on the upper end 82 of each panel 17*c* of the third, or next to last section 123 enables the folded unit to conveniently roll. The pivot bar 40 between the last two sections 123 and 124 serves as a convenient handle in directing the folded unit on its wheels. Further, the distance of the pivot bar 40 to the wheel contact with the ground is equal to that distance from that pivot bar 40 to the last section distal end 84 such that the folded unit stands supported on one side on the wheels 80 and on the other side on the last section distal end 84.

What is claimed is:

1. A foldable ramp, comprising:
   a first pivot bar, a second pivot bar, and a third pivot bar;
   a first ramp section, comprising a plurality of first section components, each of which comprises a deck panel and a pair of substantially parallel, juxtaposed, spaced-apart first side flanges, each of which defines an opening;
   a second ramp section, comprising a plurality of second section components, each of which comprises a deck panel and a pair of substantially parallel, juxtaposed spaced-apart second side flanges, each of which defines a first opening and a second opening;
   a third ramp section, comprising a plurality of third section components, each of which comprises a deck panel and a pair of substantially parallel, juxtaposed, spaced-apart third side flanges, each of which defines a first opening and a second opening; and
   a fourth ramp section, comprising a plurality of fourth section components, each of which comprises a deck panel and a pair of substantially parallel, juxtaposed, spaced-apart fourth flanges, each of which defines an opening, wherein:
   the first pivot bar is disposed through each of the first side flange openings and through each of the second side flange first openings to pivotally join the first and second ramp sections;
   the second pivot bar is disposed through each of the second side flange second openings and through each of the third side flange first openings to pivotally join the second and third ramp sections; and
   the third pivot bar is disposed through each of the third side flange second openings and through each of the fourth side flange openings to pivotally join the third and fourth ramp sections.

2. The ramp of claim 1, wherein:
   the first ramp section is narrower than the second ramp section;
   the second ramp section is narrower than the third ramp section; and
   the third ramp section is narrower than the fourth ramp section.

3. The ramp of claim 1, the ramp being configured to fold, wherein:
   the first ramp section can pivot about the first pivot bar to be substantially parallel, and in juxtaposed relation, to the second ramp section;
   the first and second ramp sections together can then pivot about the second pivot bar to be substantially parallel, and in juxtaposed relation, to the third ramp section; and the first, second, and third ramp sections together can then pivot about the third pivot bar to be substantially parallel, and in juxtaposed relation, to the fourth ramp section.

4. The ramp of claim 3, wherein after being folded:

the first, second, third, and fourth ramp sections are substantially parallel, and in juxtaposed relation, to each other;

the first ramp section is between the second ramp section and the third ramp section; and the second ramp section is between the third ramp section and the fourth ramp section.

5. The ramp of claim 1, wherein the respective section components of each ramp section are fixedly joined to one another.

6. The ramp of claim 5, wherein the section components are joined by welding.

* * * * *